T. LANE.

Potato-Digger.

No. 37,100. Patented Dec. 9, 1862.

Witnesses:
J. O. Coombs
James Laird

Inventor:
Thomas Lane
per Munn & Co
Attys

UNITED STATES PATENT OFFICE.

THOMAS LANE, OF SAN FRANCISCO, CALIFORNIA.

IMPROVEMENT IN POTATO-DIGGERS.

Specification forming part of Letters Patent No. 37,100, dated December 9, 1862.

*To all whom it may concern:*

Be it known that I, THOMAS LANE, of San Francisco, in the county of San Francisco and State of California, have invented new and useful Improvements in Machines for Digging Potatoes; and I do hereby declare the following to be a full, clear, and exact description thereof, reference being had to the accompanying drawings, making a part of this specification, in which—

Figure 1:
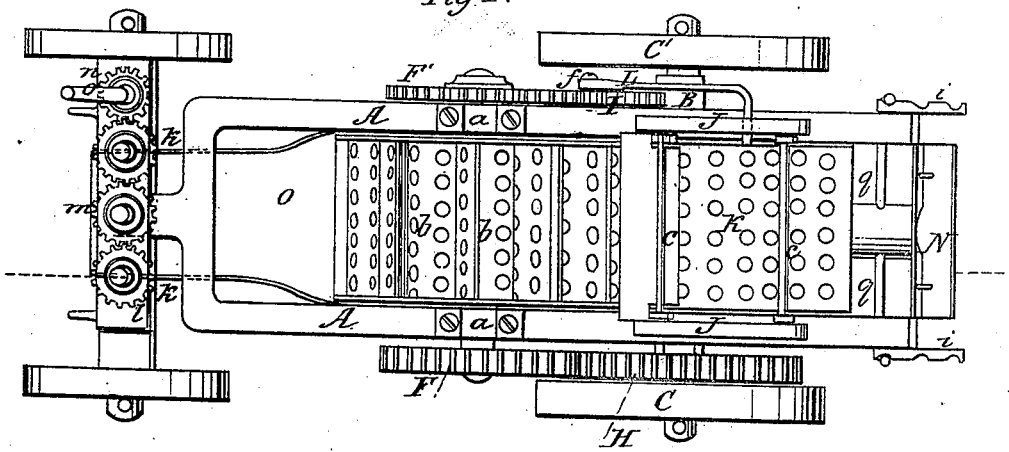
Figure 2:
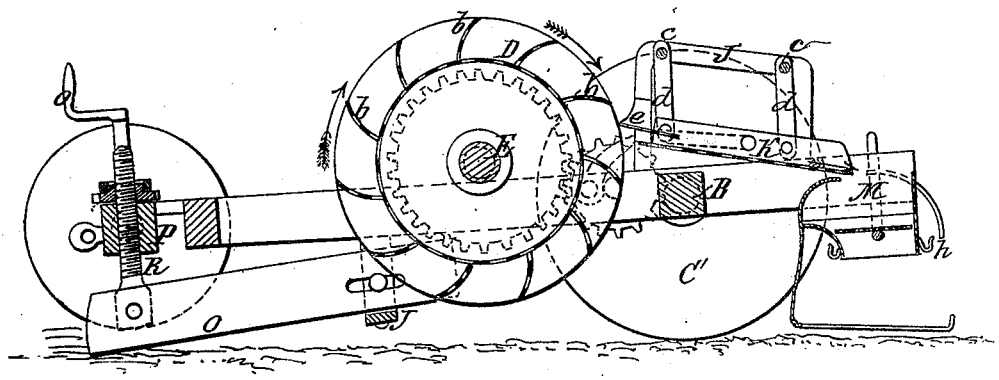

Figure 1 represents my invention by a plan. Fig. 2 is a sectional elevation of my invention, taken at the line *x x*.

Similar letters of reference indicate corresponding parts in both figures.

This invention relates to certain improvements in machines for digging potatoes and onions and putting the same into sacks; and it consists in the manner of arranging the scoop or shovel so that it can be adjusted to enter the ground at a greater or less depth; also, in the arrangements of shaking-shoe and hopper, as hereinafter to be fully explained.

To enable others skilled in the art to make and use my invention, I will proceed to describe its construction and operation.

A is a strong iron rectangular frame, supported near its back end upon an axle, B, which is provided with traction-wheels C C. The front portion of this frame is connected to an axle, P, supported upon wheels T, to which the team is attached.

D is a cylinder secured upon the shaft E, which is journaled in boxes *a a*, attached to the frame. This cylinder is perforated and provided on its periphery with a series of curved buckets, *b*, also perforated and arranged horizontally or parallel with the axis of the cylinder. On opposite ends of the shafts E cog-wheels F F' are secured, one of which, F, meshes into the teeth of cog-wheel H, attached to the inner side of the traction-wheel C, and imparts a rotary motion to the buckets, and the other, or F', meshes into the teeth of pinion I and imparts a shaking motion to the shoe, as hereinafter to be described.

J J are trestle-frames secured on top of the main frame, and connected together at top by cross bars or rods *c c*.

K is a shoe suspended between the trestle-frames from the cross-bars *c c* by links *d d*.

*e* is a chute-board attached to the trestle-frames immediately over the upper end of the shoe, and is for the purpose of guiding the potatoes from the revolving curved buckets onto the shoe.

L is a bent arm or pitman connecting the shoe to a wrist-pin, *f*, secured in the pinion I, by means of which a shaking motion is given to the shoe.

M M are hoppers attached to the rear end of the main frame immediately under the back end of the shoe. The bottoms of the said hoppers are pivoted and provided with handles *g g*, so that they can be tilted to allow the potatoes to fall directly from the shoe into sacks attached to hooks *h h* on the bottom of the hopper. *i i* are notched segment-bars attached to the sides of the frame. The handles *g g*, catching into the notches of the said bars, serve to hold the hopper-bottoms in an open or closed position.

N is a platform suspended from the hind end of the frame, upon which a person stands to remove the sacks as fast as they are filled and supply their places with empty ones.

O is a shovel supported at its back end upon the cross-bar J, pendent from the frame. This shovel is suspended at its front end from the axle P by the screw-bolts R R, attached to the sides of the shovel. These screw-bolts pass up through holes in the axle P and through screw-threaded pinions *k k*, which are kept in place on the axle by a strap, *l*.

*m* is an intermediate pinion connecting the two screw-threaded pinions together.

*n* is a pinion provided with a crank, O, by means of which the train of gearing is actuated and the front end of the shovel raised or lowered, thereby to plow a greater or less depth, as may be desired.

The operation is as follows: The team being hitched to the front of the machine, the front end of the shovel is lowered until it enters the ground beneath the potatoes, when, as the machine advances, the potatoes and loose earth are brought in contact with the revolving buckets, which raise both potatoes and loose earth. The bulk of the latter, passing through the perforation in the cylinder, falls into the drain formed by the shovel, and that which passes over with the potatoes is separated therefrom by the action of the shaking-shoe, the potatoes falling into the hoppers and the dirt passing through the meshes of the shaking-shoe. The chute-board over the upper end of the shoe prevents potatoes from falling between the revolving buckets and shoe. A man standing on the platform behind the machine takes off the sacks as fast as they are filled and puts empty ones in their places, the opening in the hopper being closed during the operation, so that the machine is not required to be stopped while the sacks are being filled. The man on the platform sews up those that are filled and leaves them on the ground. Another man sitting on the front of the machine to manage the team and regulate the depth of the shovel is all that is required to manage the machine.

This machine possesses many advantages over those which merely raise the potatoes to the surface of the ground and leave them to be packed up by hand.

What I claim as my invention as new herein, and desire to secure by Letters Patent, is—

1. The arrangement of the shovel O, screw-bolts R R, pinions $k$ $k$ $m$ $n$, crank $o$, and axle P, for raising and lowering the shovel, in combination with the frame A and revolving buckets $b$ D, operating in the manner and for the purpose described.

2. The shaking-shoe K, chute-board $e$, and revolving buckets $b$ D, in combination with the shovel O and hoppers M, provided with tilting bottoms $q$, when arranged and operating in the manner and for the purpose described.

THOS. LANE.

Witnesses:
JAMES HAGAN,
JAMES McCLOSKEY.